United States Patent [19]
Moriya et al.

[11] Patent Number: 5,230,466
[45] Date of Patent: Jul. 27, 1993

[54] HUMIDITY CONTROL APPARATUS

[75] Inventors: Yoshifumi Moriya, Nara; Toshiya Fujito, Yamatokouriyama, both of Japan

[73] Assignee: Matsushita Electric Industrial Co., Ltd., Kadoma, Japan

[21] Appl. No.: 845,260

[22] Filed: Mar. 3, 1992

[30] Foreign Application Priority Data

| Mar. 5, 1991 [JP] Japan | 3-38313 |
| Mar. 5, 1991 [JP] Japan | 3-38315 |
| Mar. 5, 1991 [JP] Japan | 3-38317 |
| Mar. 11, 1991 [JP] Japan | 3-44741 |

[51] Int. Cl.⁵ ................................ G05D 22/00
[52] U.S. Cl. ..................... 236/44 A; 236/49.3; 62/94; 62/176.1; 62/271; 454/256
[58] Field of Search ............... 62/94, 91, 92, 93, 271, 62/176.1, 176.5, 176.6, 325; 236/44 R, 44 A, 44 C, 49.3; 165/16, 21; 454/256

[56] References Cited

U.S. PATENT DOCUMENTS

| 2,401,560 | 6/1946 | Graham et al. | 62/325 X |
| 3,269,715 | 8/1966 | Wellford, Jr. | 236/44 R |
| 4,711,097 | 12/1987 | Besik | 62/271 |

FOREIGN PATENT DOCUMENTS

| 63-286634 | 11/1988 | Japan . |
| 63-306341 | 12/1988 | Japan . |
| 1-291023 | 11/1989 | Japan . |
| 203139 | 8/1990 | Japan | 454/256 |

Primary Examiner—Harry B. Tanner
Attorney, Agent, or Firm—Cushman, Darby & Cushman

[57] ABSTRACT

The humidity control apparatus comprising solid absorbers (13a, 13b) and a heater therebetween selects the suitable operation mode among a dehumidification operation, a dehumidification with ventilation operation, a humidification operation and a dehumidification with ventilation operation, in accordance with the detected data of a temperature sensor (17), a moisture sensor (18) and an oxygen sensor (19). The apparatus selects and operates a suitable operation mode by combination of controllings of an intake damper (10) for selecting the inlet air-flow course, an exhaust damper (11) for selecting the outlet air-flow course, the heater (14) for heating the solid adsorbers (13a, 13b), a fan for flowing the air in the solid adsorbers (13a, 13b).

12 Claims, 12 Drawing Sheets

HUMIDITY CONTROL APPARATUS

FIELD OF THE INVENTION AND RELATED ART STATEMENT

1. Field of the Invention

The present invention relates to a humidity control apparatus which has plural functions of a dehumidification, a humidification and a ventilation, particularly in a dry type which does neither need to be supplied with water and nor dispose drain.

2. Description of the Related Art

A conventional humidity control apparatus which has two functions as dehumidifier and humidifier is disclosed by the Japanese published unexamined patent application No. Sho 63-286634 (Tokkai Sho 63-286634). The conventional humidity control apparatus of dry type, which does not need supply of water, is shown in FIG. 12 which shows a cross sectional view. As shown in FIG. 12, the conventional humidity control apparatus comprises a solid adsorber 31, a heater 32, a fan 33 and two-directional control valves 34a, 34b. The fan 33 is provided to make a flow of air in a room in a direction shown by arrows X in FIG. 12. The heater 32 is arranged at the upstream side of the solid adsorber 31 in the air-flow course. The above-mentioned conventional humidity control apparatus carries out an adsorption process for adsorbing a moisture from the exterior air in first step for humidificating. In the adsorption process, the two-directional control valves 34a, 34b are turned at positions which are shown by alternate long and short dash lines in FIG. 12. As a result, an interior inlet port 35 and an interior outlet port 36 are closed by the directional control valves 34a, 34b, respectively, and external air from the exterior space (i.e., outdoor air) is sucked into the humidity control apparatus through the exterior inlet port 37. The sucked air in the humidity control apparatus is discharged to the exterior space through an exterior outlet port 38 after its passing through the solid adsorber 31. When the external air passes through the solid adsorber 31, the moisture which is contained in the sucked air is adsorbed by the solid adsorber 31.

After the above-mentioned humidity adsorption process is performed in the humidification operation, the conventional humidity control apparatus performs a desorption process in the humidification operation for discharging the adsorbed moisture into the objective air space. In the desorption process, the directional control valves 34a, 34b are turned to the other positions which are shown by solid lines in FIG. 12. As a result, the exterior inlet port 37 and the exterior outlet port 38 are closed by the directional control valves 34a, 34b, respectively, and the internal air is sucked into the humidity control apparatus through the interior inlet port 35. The sucked air in the humidity control apparatus is discharged to the room through the interior outlet port 36 after the sucked air passes through the solid adsorber 31. When the internal air passes through the solid adsorber 31, the solid adsorber 31 is dried by the sucked air which is heated by the heater 32. As a result, the moisture of the solid adsorber 31 is desorbed by the heated air, and the heated humidified air is discharged to the internal air of the room. As mentioned above, the moisture is fed from the interior outlet port 36 to the air in the room. By alternately operating the aforementioned adsorption process and the above-mentioned desorption process, the moisture in the solid adsorber 31 is supplied to the internal air, and hence, the internal air i.e., the air in the room is humidified.

However, the above-mentioned conventional humidity control apparatus had the following problems:

(1) The conventional humidity control apparatus uses a Thermal Swing Adsorption system (TSA) in the desorption process of the humidification operation. The Thermal Swing Adsorption system (TSA) is used for speedy drying of the solid adsorber 31. The solid adsorber 31 in the desorption process is dried by the sucked internal air having a higher temperature than a temperature of the external air sucked into the humidity control apparatus on the adsorption process. Therefore, the conventional humidity control apparatus in the desorption process bears such losses as, (i) a heat exchange loss when the internal air is heated by the heater 32, (ii) a radiation loss when the heated air is passing the air-flow course in the humidity control apparatus, and (iii) a heat loss when the solid adsorber 31 is dried by the heated air. As a result, a large quantity of the heat energy is consumed into loss in the desorption process of the conventional humidity control apparatus, and thereby an operation cost is put up.

Further, since the solid adsorber 31 is indirectly heated by the warm air which is heated by the heater 32, the conventional humidity control apparatus requires a long rise time period until becoming to the state of heating of the solid adsorber 31 in the desorption process. Accordingly, the conventional humidity control apparatus, which alternately carries out the adsorption process and the desorption process, has only a low ability of humidification which depends poor efficiency of the desorption process which requires a long time. If the time period for the desorption process would be selected in designing to be a short time period, a large-size solid adsorber and a large power heater must be used in the conventional humidity control apparatus in order to achieve the high capability for humidification.

(2) Though, the conventional humidity control apparatus has inlet and outlet ducts communicating between the external air and the internal air, the conventional humidity control apparatus can not carry out a ventilation function.

(3) In the humidification operation of the conventional humidity control apparatus, the solid adsorber 31 adsorbs moisture of the external air, and the adsorbed moisture is discharged to the internal air by the air passed through the solid adsorber 31. At the same time, the solid adsorber 31 also adsorbs atmospheric nitrogen [$N_2$] with a moisture. Though a volume of the adsorbed nitrogen [$N_2$] varies depending upon various kinds of the solid adsorber 31, the adsorbed nitrogen [$N_2$] is discharged to the internal air together with the moisture, in the humidification operation of the conventional humidity control apparatus. As a result, concentration of oxygen [$O_2$] (relative volume of oxygen[$O_2$]) in the internal air decreases, while moisture of the internal air is increased.

OBJECT AND SUMMARY OF THE INVENTION

An object of the present invention is to provide an automatic humidity control apparatus which can automatically and appropriately carry out all of humidification, dehumidification and ventilation of the internal air of a room to be controlled.

In order to achieve the above-mentioned object, the humidity control apparatus of the present invention comprises:

an adsorber unit which is provided on an airflow course to adsorb moisture in air, a heater which heats the adsorber unit to desorb moisture in the adsorber unit, a fan for making internal air flow or external air flow toward the adsorber unit, an intake damper which is provided at an upstream side of the adsorber unit, and is positioned to close an internal-air inlet-port or an external-air inlet-port in accordance with a selected operation mode, an exhaust damper which is provided at a downstream side of the adsorber unit, and is positioned to close an internal-air outlet-port or an external-air outlet-port in accordance with a selected operation mode, and a controller which controls operations of the heater, the fan, the intake damper and the exhaust damper in accordance with a selected operation mode, the controller is for selecting either one of the following two operation modes;

(i) a dehumidification operation mode having an adsorption process for adsorbing moisture in internal air into the adsorber unit, thereafter the interior air is discharged to an interior space, and a desorption process for operating the heater and the fan flowing the exterior air to the adsorber unit to desorb moisture in the adsorber unit, thereafter the external air is discharged to an exterior space; and (ii) a humidification operation mode having an adsorption process for adsorbing moisture in external air into the adsorber unit, thereafter the external air is discharged to the exterior space, and a desorption process for operating the heater and the fan flowing the internal air to the adsorber unit to desorb moisture in the adsorber unit, thereafter the internal air is discharged to interior space.

According to the above-mentioned humidity control apparatus of the present invention, the humidity control apparatus has such advantages in its economically supreme cost, in its easy maintenance, and in its appropriate operations of humidification, dehumidification and ventilation for a room to be controlled.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, a preferred embodiment of a humidity control apparatus of the present invention is described with reference to the accompanying drawings of FIGS. 1 to 11.

Figure 1:
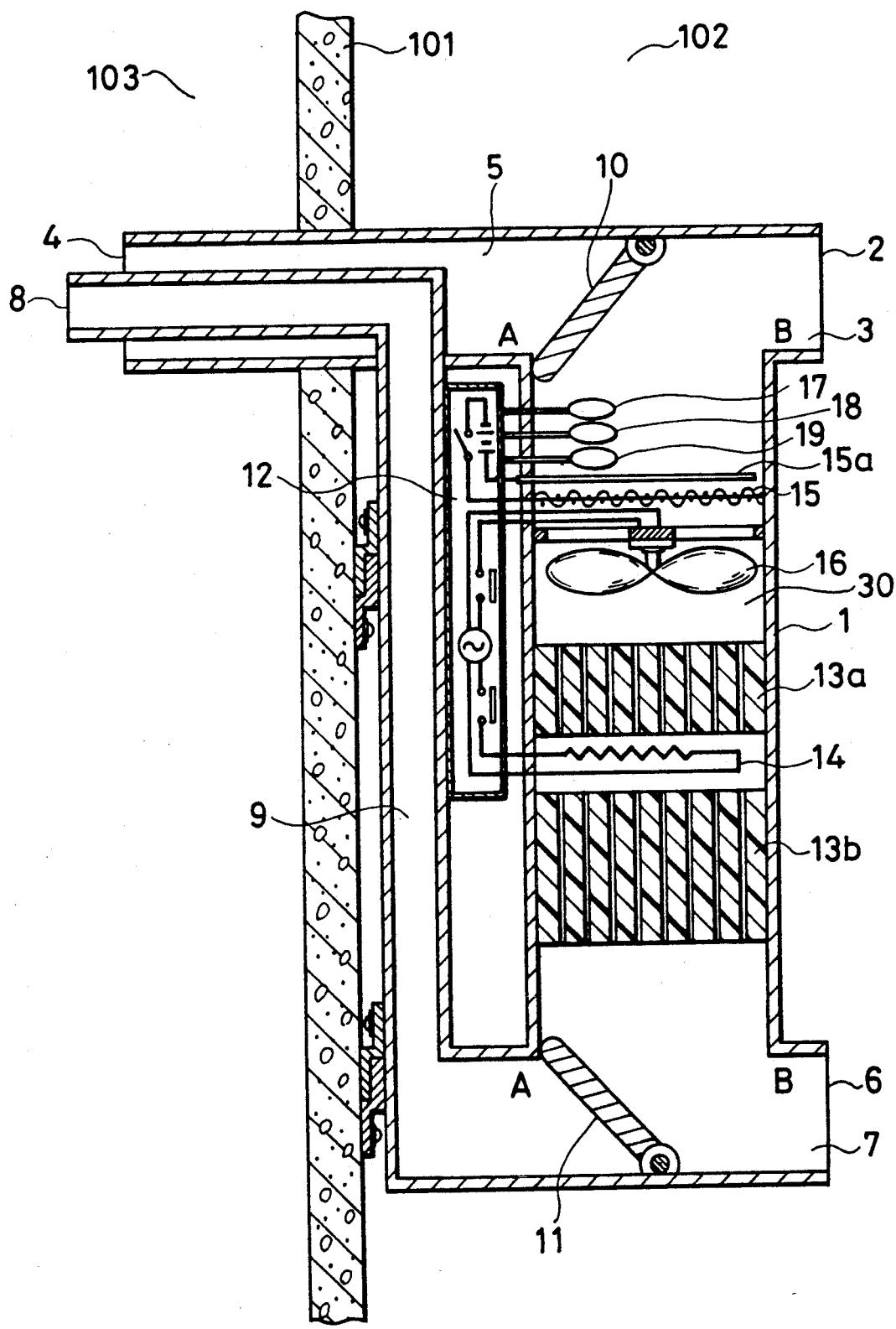
FIG. 1 is a sectional view showing a non-operation state of a humidity control apparatus of the present invention.

FIG. 1 is a sectional view showing a non-operation state of the humidity control apparatus of the embodiment of the present invention. As shown in FIG. 1, a casing 1 of the humidity control apparatus is installed to a wall 101 which partitions into an interior space 102, such as a room in a house, and an exterior space 103. An internal-air inlet-passage 3, which has an internal-air inlet-port 2, and an external-air inlet-passage 5, which has an external-air inlet-port 4, are provided at an upper portion of the casing 1. The external-air inlet passage-5 is provided by boring through the wall 101. In a lower portion of the casing 1, an internal-air outlet-passage 7 having an internal-air outlet-port 6 is provided to discharge air to the interior space 102. An external-air outlet-passage 9 has an external-air outlet-port 8 facing the exterior space 103. In at least the through-the wall portion of the external-air outlet-passage 9, the external-air outlet-passage 9 is arranged in the above-mentioned external-air inlet-passage 5 in the upper portion of the casing 1. Therefore, the through-the wall portion of the passage is constructed by a double tube structure. An intake damper 10 for controlling an inlet direction of the air is rotatably provided at an upper branching part between the internal-air inlet-passage 3 and the external-air inlet-passage 5 of the casing 1. An exhaust damper 11 for controlling an outlet direction of the air is provided switchable at a lower branching part between the internal-air outlet-passage 7 and the external-air outlet-passage 9 of the casing 1. The intake damper 10 and the exhaust damper 11 are operated by a damper drive unit (not shown). The damper drive unit is driven by a control motor, such as a pulse motor which is controlled by a control signal from a controller 12. In an intermediate passage 30, which connects the inlet passage of the upper casing to the outlet passage of the lower casing, a first solid adsorber 13a and a second solid adsorber 13b are disposed holding the predetermined interval between them. The first solid adsorber 13a and the second solid adsorber 13b have a function of an adsorber for adsorbing the moisture in the air, and another function of an evaporator for desorbing the moisture by heating. The first solid adsorber 13a and the second solid adsorber 13b, which are made of zeolite or silicagel, are formed in a corrugated shape or a honeycomb shape. The first solid adsorber 13a, which is arranged at upstream side of the intermediate passage 30, is selected to have a smaller volume than the second solid adsorber 13b, which is arranged at downstream side of the intermediate passage 30. A heater 14 for heating the first solid adsorber 13a and the second solid adsorber 13b is disposed near and between the first solid adsorber 13a and the second solid adsorber 13b. When the dehumidification operation, the humidification operation and the like are operated by the humidity control apparatus of the present invention, the heater 14 is electrified to heat the first solid adsorber 13a mainly by radiation and the second solid adsorber 13b mainly by conduction through air flow, thereby making the moisture thereon desorb therefrom. A known electrically charged filter 15 for cleaning the sucked air is arranged at upstream side of the fan 16 to blow the cleaned internal air or the cleaned external air into the first solid adsorber 13a and the second solid adsorber 13b. As shown in FIG. 1, a temperature sensor 17, a moisture sensor 18, an oxygen sensor 19 are arranged adjacent to the charged filter 15 and at the upper portion of the intermediate passage 30. The temperature sensor 17 is provided for detecting the temperature of the sucked internal air and the sucked external air. The moisture sensor 18 is provided for detecting the moisture in the sucked air, and the oxygen sensor 19 is provided for detecting concentration of oxygen in the sucked air. A controller 12 receives output signals from these sensors, and controls operations of the intake damper 10, the exhaust damper 11, the heater 14 and the fan 16.

Figure 2:
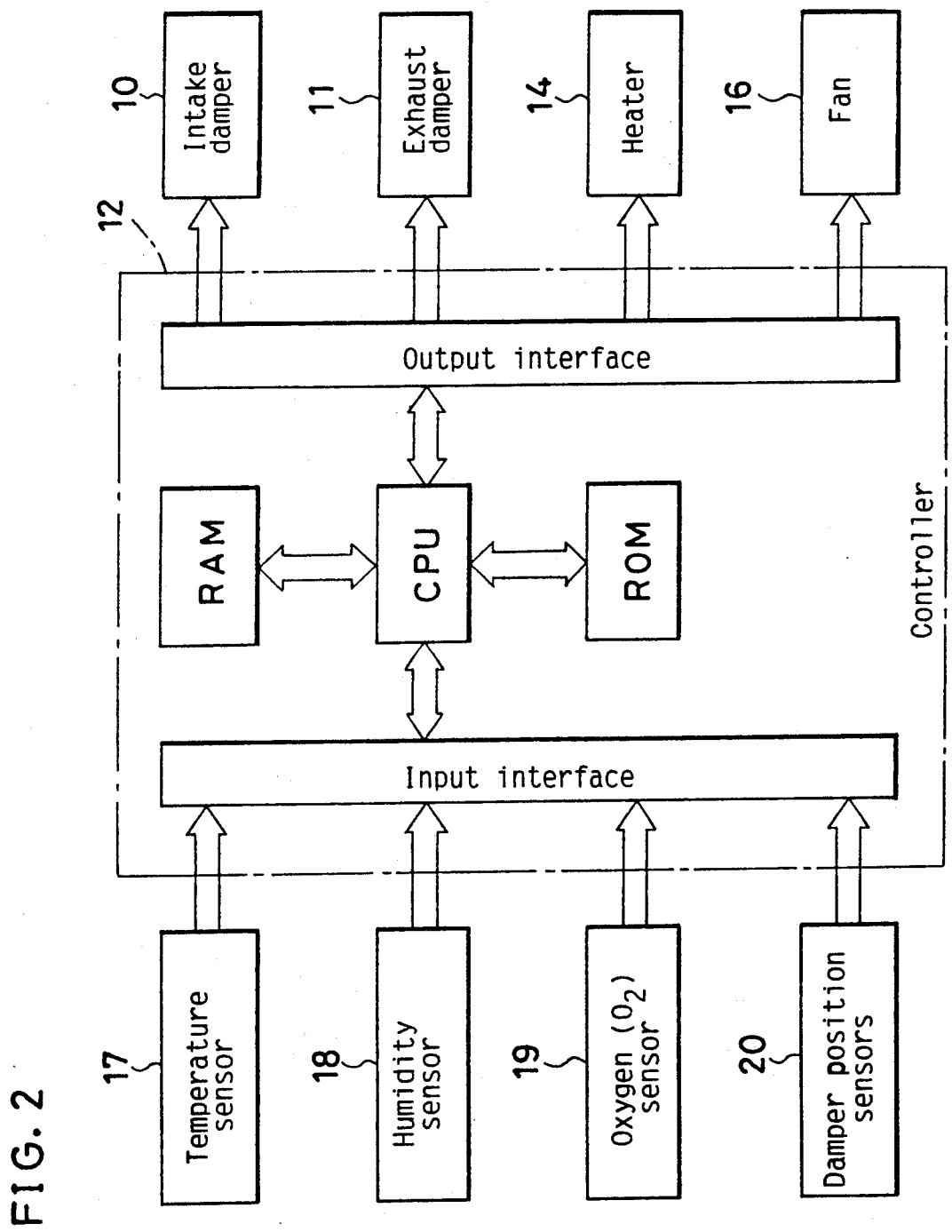
FIG. 2 is a block diagram showing components of the humidity control apparatus shown in FIG. 1.

FIG. 2 is a block diagram of main components of the above-mentioned humidity control apparatus. The above-mentioned controller 12 compares the detected signals of the temperature sensor 17, the moisture sensor 18 and the oxygen sensor 19 with the predetermined reference data of temperature, humidity and concentration of oxygen. And, the controller 12 controls these operation of the intake damper 10, the exhaust damper 11, the heater 14 and the fan 16 corresponding to the results of the comparison of the detected signals with the predetermined reference values. The current positions of the intake damper 10 and exhaust damper 11 are detected by a damper position sensors 20, and the detected position signals of the damper position sensor 20 are inputted to the controller 12 as a feedback control loop.

Next, basic operation of the above-mentioned humidity control apparatus is described with reference to FIG. 1.

When a power supply switch (not shown) of the humidity control apparatus is closed, the fan 16 rotates in the condition shown in FIG. 1. In other words, the fan 16 is driven in the condition that the intake damper 10 is arranged at position A to close the external-air inlet-passage 5, and that the exhaust damper 11 is arranged at position A to close the external-air outlet-passage 9. As a result, internal air of a room to be controlled is sucked in from the internal-air inlet-port 2 and touches the temperature sensor 17, the moisture sensor 18 and the oxygen sensor 19. The temperature, the humidity and the oxygen concentration in the sucked internal air are surely detected by these sensors. The detected data of the temperature, the humidity and the oxygen concentration in the internal air are transferred to the above-mentioned controller 12. According to the detected data, the humidity control apparatus of the present invention performs arithmetic operation, and selects an appropriate operation in the following four kinds of operations:

In a first case that the detected relative humidity in the internal air is higher than 60% and the detected oxygen concentration in the internal air is no less than a predetermined value, such as 20%, the controller 12 orders to operate a dehumidification operation.

In a second case that the detected relative humidity in the internal air is higher than 60% and the detected oxygen concentration in the internal air is less than a predetermined value, such as 20%, the controller 12 orders to operate a dehumidification operation with ventilation.

In a third case that detected relative humidity in the internal air is less than 40%, and the detected oxygen concentration in the internal air is no less than a predetermined value, such as 20%, the controller 12 orders to operate a humidification operation.

In a fourth case that the detected relative humidity in the internal air is less than 40% and the detected oxygen concentration in the internal air is less than a predetermined value, such as 20%, the controller 12 orders to operate the humidification operation with ventilation.

Next, the above-mentioned four kinds of the operations, that is the dehumidification operation without ventilation, the dehumidification operation with ventilation, the humidification operation without ventilation and the humidification operation with ventilation, are described with reference to the accompanying drawings of FIGS. 3 to 11.

Hereafter, the "dehumidification without ventilation" and "humidification without ventilation" are simply referred to as "dehumidification" and "humidification" for the shortness of the elucidation.

DEHUMIDIFICATION OPERATION

When the controller 12 of the humidity control apparatus judges basing on the detected data of the temperature sensor 17, the moisture sensor 18 and the oxygen sensor 19 that the dehumidification operation should be operated, the controller 12 orders start of a first step of a desorption process. In the desorption process, the moistures which are contained in the first solid adsorber 13a and the second solid adsorber 13b are desorbed by heating. When the controller 12 orders start of the dehumidification operation, it is necessary to make desorptions of the first solid adsorber 13a and the second solid adsorber 13b, since these already have contained the moisture of the internal air of the room owing to a natural convection in the room. Therefore, the moistures of the first solid adsorber 13a and the second solid adsorber 13b need to be desorbed in the first step by using the desorption process.

DESORPTION PROCESS IN DEHUMIDIFICATION OPERATION

Figure 3:
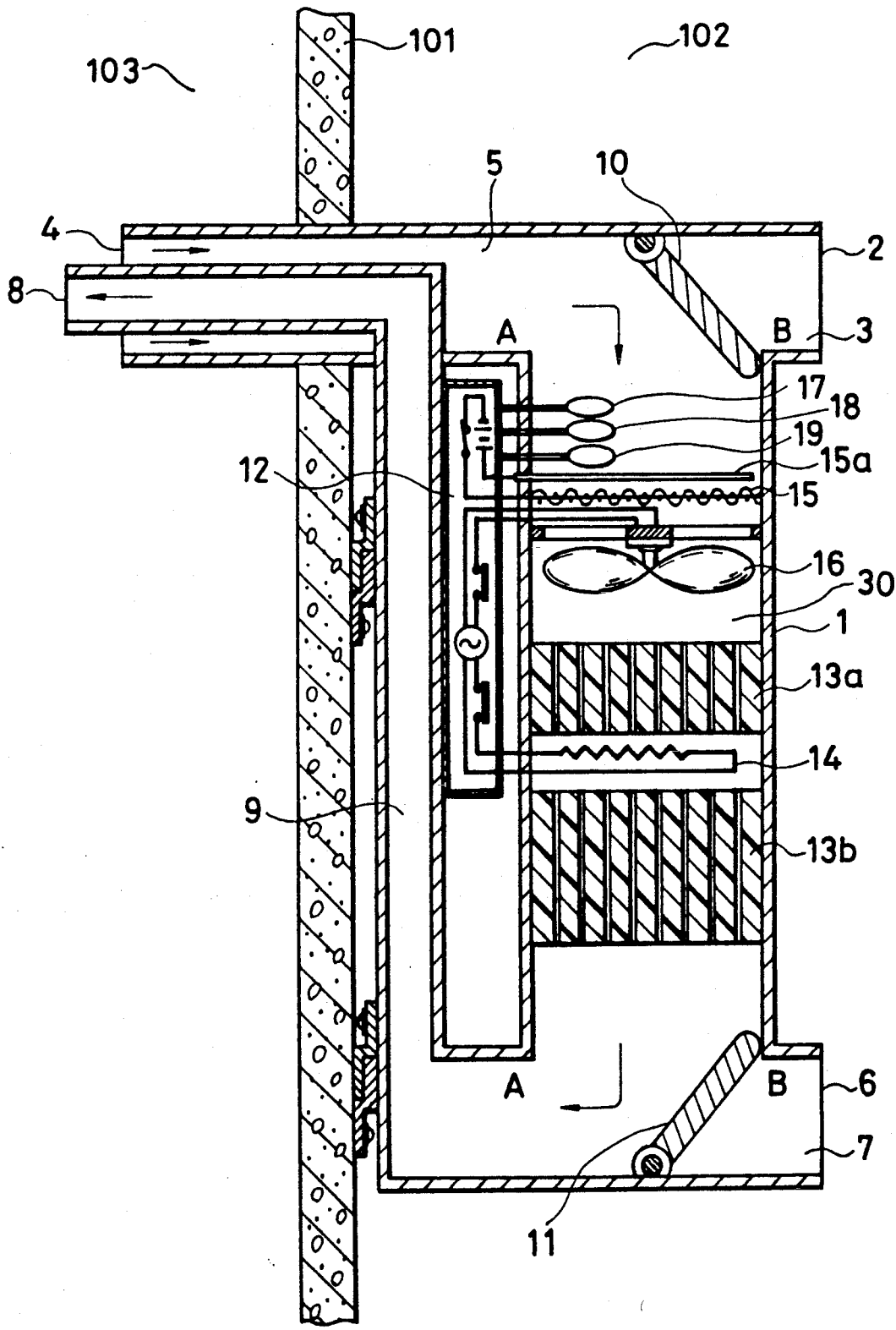
FIG. 3 is a sectional view showing a desorption process in dehumidification operation of the humidity control apparatus shown in FIG. 1.

In the first step of the desorption process, the intake damper 10 and the exhaust damper 11 are turned to close the internal-air inlet-passage 3 and the internal-air outlet-passage 7, respectively. FIG. 3 shows an operating condition of the desorption process in the dehumidification operation. As shown in FIG. 3, the intake damper 10 and the exhaust damper 11 are turned to position B by the above-mentioned damper drive unit, which has a pulse motor. In the above-mentioned conditions shown in FIG. 3, when the controller 12 orders start of the operations of the fan 16 and the heater 14, the external air sucked from the external-air inlet-port 4 is heated by the heater 14, and becomes the high temperature or heated air. The first solid adsorber 13a is heated directly by the heat generated by the heater 14, and the second solid adsorber 13b is heated by the high temperature air. Since the heater 14 is disposed at a position near and between the first solid adsorber 13a and the second solid adsorber 13b, almost all of the heat energy generated from the heater 14 is efficiently received and absorbed by the first solid adsorber 13a and the second solid adsorber 13b. The first solid adsorber 13a and the second solid adsorber 13b, which are efficiently heated by the radiant heat and the high temperature wind, desorbs the absorbed moisture. The desorbed moisture is discharged from the external-air outlet-port 8. When a predetermined time interval lapses after start of energization of the heater 14, the first solid adsorber 13a and the second solid adsorber 13b are in the desorbed state. When the first solid adsorber 13a and the second solid adsorber 13b become the desorbed state, the controller 12 orders to stop the operation of the heater 14, but to keep the fan 16 in operating. The fan 16 continues to be operated until the temperature of the first solid adsorber 13a and the second solid adsorber 13b become such a low temperature that the first solid adsorber 13a and the second solid adsorbed 13b can absorb the moisture again in the internal air of the room. When the fan 16 is operated for a predetermined time interval, the fan 16 is stopped, and the desorption process in the dehumidification operation has finished.

ADSORPTION PROCESS IN DEHUMIDIFICATION OPERATION

Figure 4:
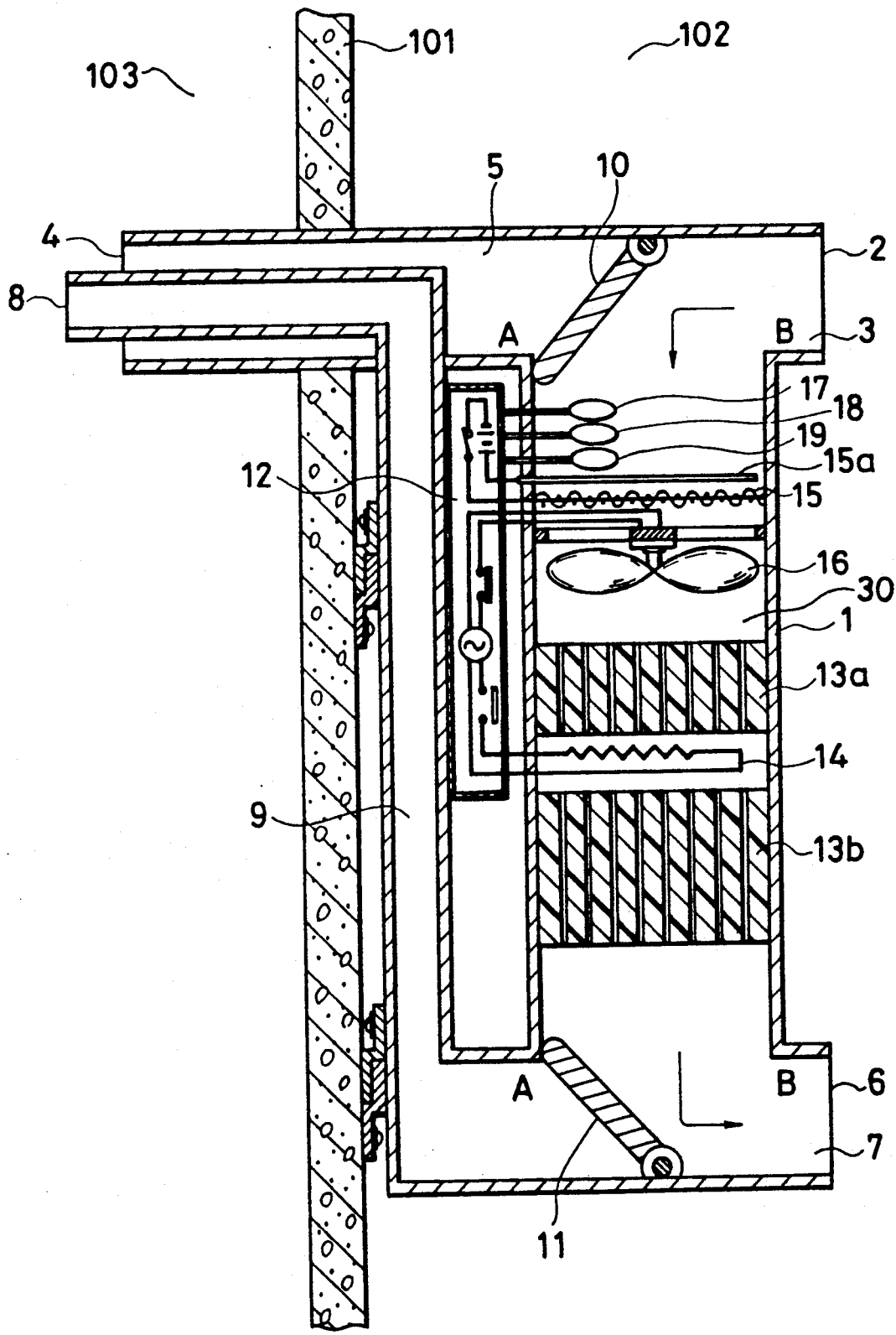
FIG. 4 is a sectional view showing an adsorption process in dehumidification operation of the humidity control apparatus shown in FIG. 1.

Next, the controller 12 orders to start an adsorption process in the dehumidification operation. In the adsorption process, the moisture in the sucked air is adsorbed by the first solid adsorber 13a and the second solid adsorber 13b. FIG. 4 shows the operation state of the adsorption process in the dehumidification operation. As shown in FIG. 4, the intake damper 10 and the exhaust damper 11 are turned to position A to close the external-air inlet-passage 5 and the external-air outlet-passage 9, respectively. In the above-mentioned conditions shown in FIG. 4, the controller 12 orders to start the operation of the fan 16. As a result, the internal air of the interior space 102 is sucked in the casing 1 from the internal-air inlet-port 2, and floating dust and particles in the internal sucked air are attracted by the charged filter 15 charged by the discharge wire 15a. And, since the moisture in the sucked air is absorbed by the first solid adsorber 13a and the second solid adsorber 13b, pure dry air is supplied from the internal-air outlet-port 6 to the interior space 102 to be dehumidified. Length of the predetermined time interval for supplying the pure dry air to the room is selected by the controller 12 which takes account of the absorption capacities of the first solid adsorber 13a and the second solid adsorber 13b, the detected relative humidity of the internal air, the heat-radiation capacity of the heater 14, the ventilation capacity of the fan 16 and the space of the room for service.

The above-mentioned humidity control apparatus of the present invention can perform the dehumidification operation for the internal air of the interior space 102 by alternately carrying out the aforementioned desorption process and the above-mentioned adsorption process, by switching the positions of the dampers 10 and 11 in synchronism with the alternation between the adsorption and the desorption. The humidity control apparatus of the present invention is advantageous in its easy handling of the dehumidification operation. And, the humidity control apparatus can perform the energy-saving dehumidification operation effected by a high heat efficiency because of the arrangement of the heater 14 between the first solid adsorber 13a and the second solid adsorber 13b.

Apart from the above-mentioned embodiment of the humidity control apparatus which is operated in normal capacity in the dehumidification operation, a modified embodiment may be such that, the dehumidification operation is operated by a maximum capacity of the humidity control apparatus until the humidity of the room reaches a predetermined value in order to quickly reach the predetermined humidity value. In case where the detected humidity of the room is much different from the predetermined reference humidity value, such humidity control apparatus would have a high efficiency. In order to operate the humidity control apparatus in the maximum capacity of the dehumidification operation, the heater 14 is controlled to perform the maximum heat-generation in the desorption process, while in the adsorption process, the fan 16 is controlled to work at the maximum ventilation capacity.

And further, the humidity control apparatus may be operated in a lowered or, in some case minimum capacity of the dehumidification operation in adjusting a little fluctuations of the humidity of the room, once after the internal humidity reaches the predetermined humidity value once. In order to operate the humidity control apparatus in the lowered, or further in the minimum capacity of the dehumidification operation, the desorption process is operated by the minimum heat-radiation capacity of the heater 14, and the adsorption process is operated by the minimum ventilation capacity of the fan 16. As a result, this humidity control apparatus of the present invention has an advantage of power-saving in case of quick but little fluctuation of humidity in the room.

DEHUMIDIFICATION OPERATION WITH VENTILATION

When the controller 12 of the humidity control apparatus judges from the detected data of the temperature sensor 17, the moisture sensor 18 and the oxygen sensor 19 that the dehumidification together with ventilation should be operated, the controller 12 orders to start the dehumidification operation together with ventilation. The dehumidification operation with ventilation is the operation mode that the humidity of the internal air of the interior space 102 is decreased to reach the predetermined reference humidity, and at the same time, the internal air in the interior space 102 is ventilated.

DESORPTION PROCESS IN DEHUMIDIFICATION OPERATION WITH VENTILATION

Figure 5:
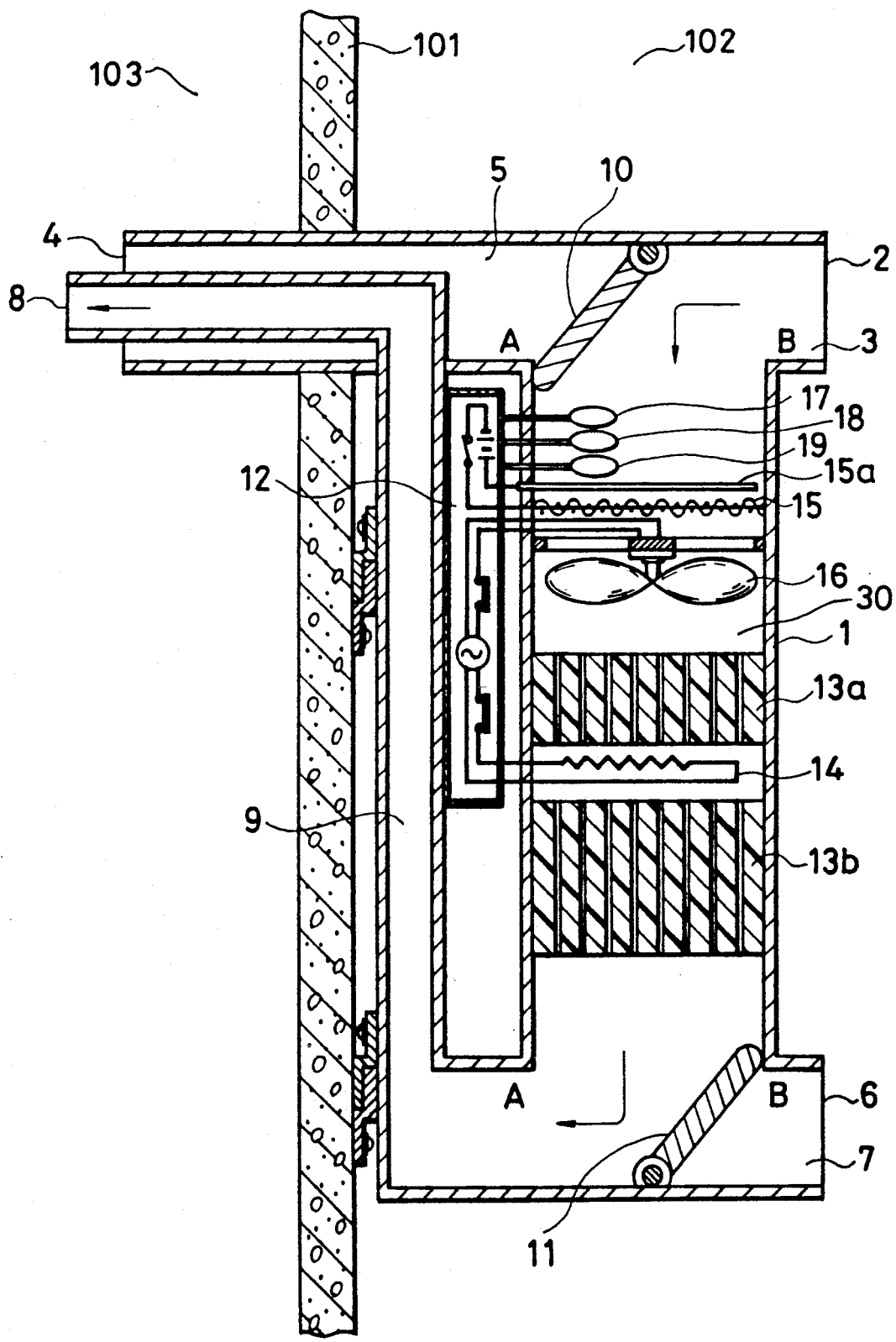
FIG. 5 is a sectional view showing a desorption process in dehumidification operation with ventilation of the humidity control apparatus shown in FIG. 1.

In the first step of the dehumidification operation with ventilation, the controller 12 orders start of a desorption process for desorbing the moisture of the first solid adsorber 13a and the second solid adsorber 13b. FIG. 5 shows the operation state of the desorption process. As shown in FIG. 5, the intake damper 10 is positioned to the position A so as to close the external-air inlet-passage 5, and the internal air of the interior space 102 is sucked through the internal-air inlet-passage 3. The exhaust damper 11 is positioned to the position B for discharging the sucked internal air to the exterior space 103. And, the fan 16 and the heater 14 are electrified by the order of the controller 12. As a result, the moisture which is contained in the first solid adsorber 13a and the second solid adsorber 13b is desorbed by the radiant heat and the high temperature wind by means of operating the heater 14 and the fan 16. And, the desorbed moisture is discharged from the external-air outlet-port 8. When the predetermined time interval has lapsed after the energization of the heater 14, the first solid adsorber 13a and the second solid adsorber 13b are in the desorbed state. When the first solid adsorber 13a and second solid adsorber 13b become the desorbed state, the controller 12 orders to stop the operation of the heater 14, but to keep the fan 16 in operating. The fan 16 is operating for cooling the first solid adsorber 13a and the second solid adsorber 13b for a predetermined time interval.

ADSORPTION PROCESS IN DEHUMIDIFICATION OPERATION WITH VENTILATION

Figure 6:
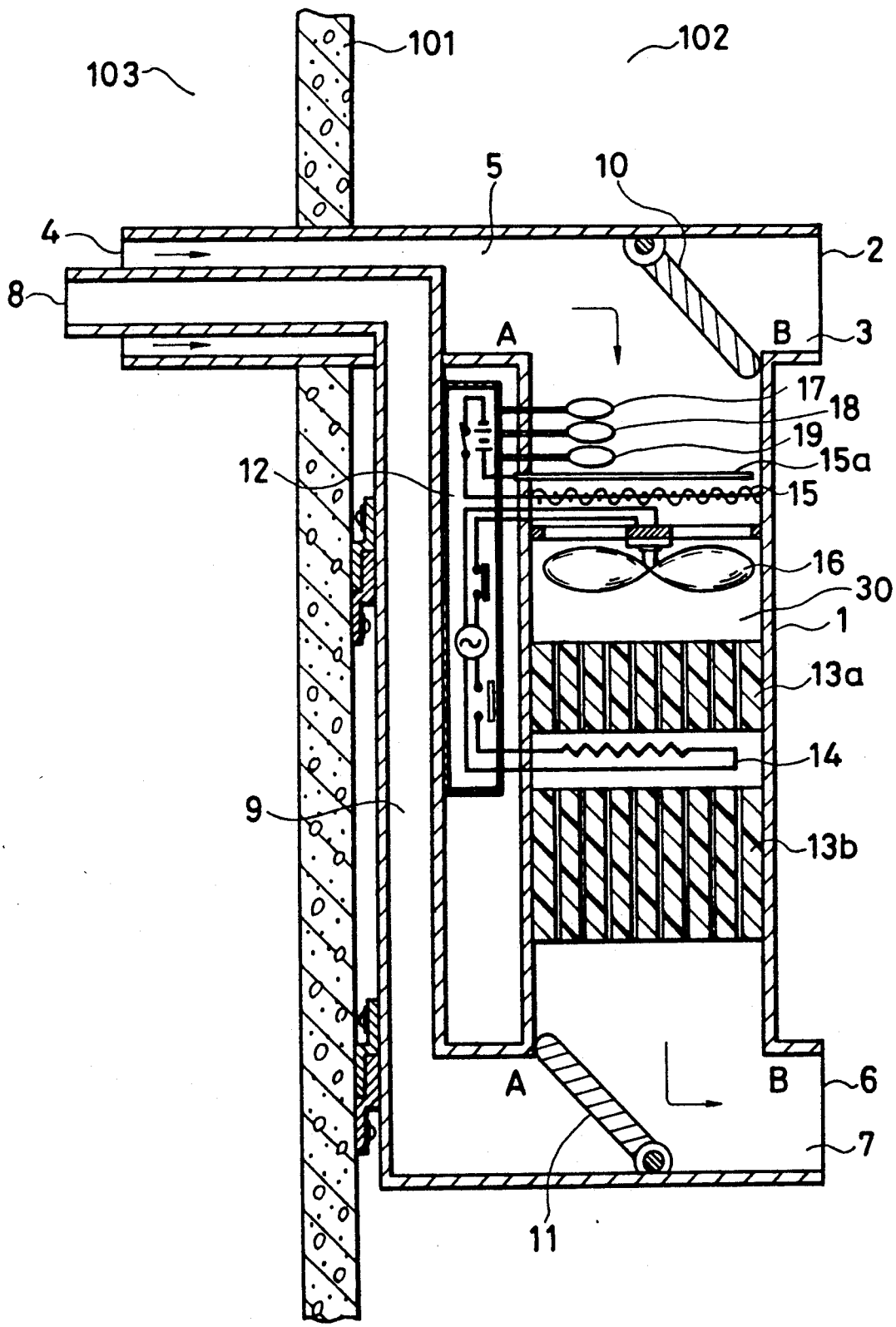
FIG. 6 is a sectional view showing an adsorption process in dehumidification operation with ventilation of the humidity control apparatus shown in FIG. 1.

Next, the controller 12 orders start of an adsorption process in the dehumidification operation with ventilation. FIG. 6 shows an operation state of the adsorption process in the dehumidification operation with ventilation. As shown in FIG. 6, the intake damper 10 is turned to the position B, and the exhaust damper 11 is turned to the position A.

In the above-mentioned conditions shown in FIG. 6, the controller 12 orders start of the operation of the fan 16. As a result, the external air is sucked in the casing 1 from the external-air inlet-port 4, and floating dust and particles in the sucked external air are attracted by the charged filter 15. Since the moisture in the sucked external air is absorbed by the first solid adsorber 13a and the second solid adsorber 13b, the pure dry air is supplied from the internal-air outlet-port 6 to the interior space 102 to be dehumidified for a predetermined time interval. The predetermined time interval for supplying pure dry air to the interior space 102 is selected by the controller 12 which takes account of the absorption capacities of the first solid adsorber 13a and the second solid adsorber 13b, the detected relative humidity of the internal air, the heat-radiation capacity of the heater 14, the ventilation capacity of the fan 16 and the space of the room for service.

The above-mentioned humidity control apparatus of the present invention can perform the dehumidification operation together with ventilation for the internal air of the interior space 102 by alternately operating the aforementioned desorption process and the above-mentioned adsorption process. And, the humidity control apparatus of the present invention can remove contaminants in the internal air of the interior space 102 by operating the ventilation together with the dehumidification operation.

HUMIDIFICATION OPERATION

When the controller 12 of the humidity control apparatus judges basing on the detected data of the temperature sensor 17, the moisture sensor 18 and the oxygen sensor 19 that the humidification operation should be operated, the controller 12 orders start of an adsorption process in the humidification. In other words, when the relative humidity in the interior space 102 is less than 40%, and the oxygen concentration is higher than a predetermined value, the controller 12 orders to start the adsorption process in the humidification operation. When the controller 12 orders the start of the adsorption process, the first solid adsorber 13a and the second solid adsorber 13b already contain to some extent the moisture of the internal air of the room owing to a natural convection in the room. But, the adsorption process is further operated in a first step of the humidification operation in order to absorb the moisture of the internal air to the extent of saturation of the adsorption. Thus the first adsorption process is operated until the first solid adsorber 13a and the second solid adsorber 13b are saturated with the moisture of the internal air. As mentioned above, the humidification operation is started from the adsorption process. Therefore, a time interval for the first adsorption process in the humidification operation may be selected to be shorter than it of a second adsorption process thereafter.

ADSORPTION PROCESS IN HUMIDIFICATION OPERATION

Figure 7:
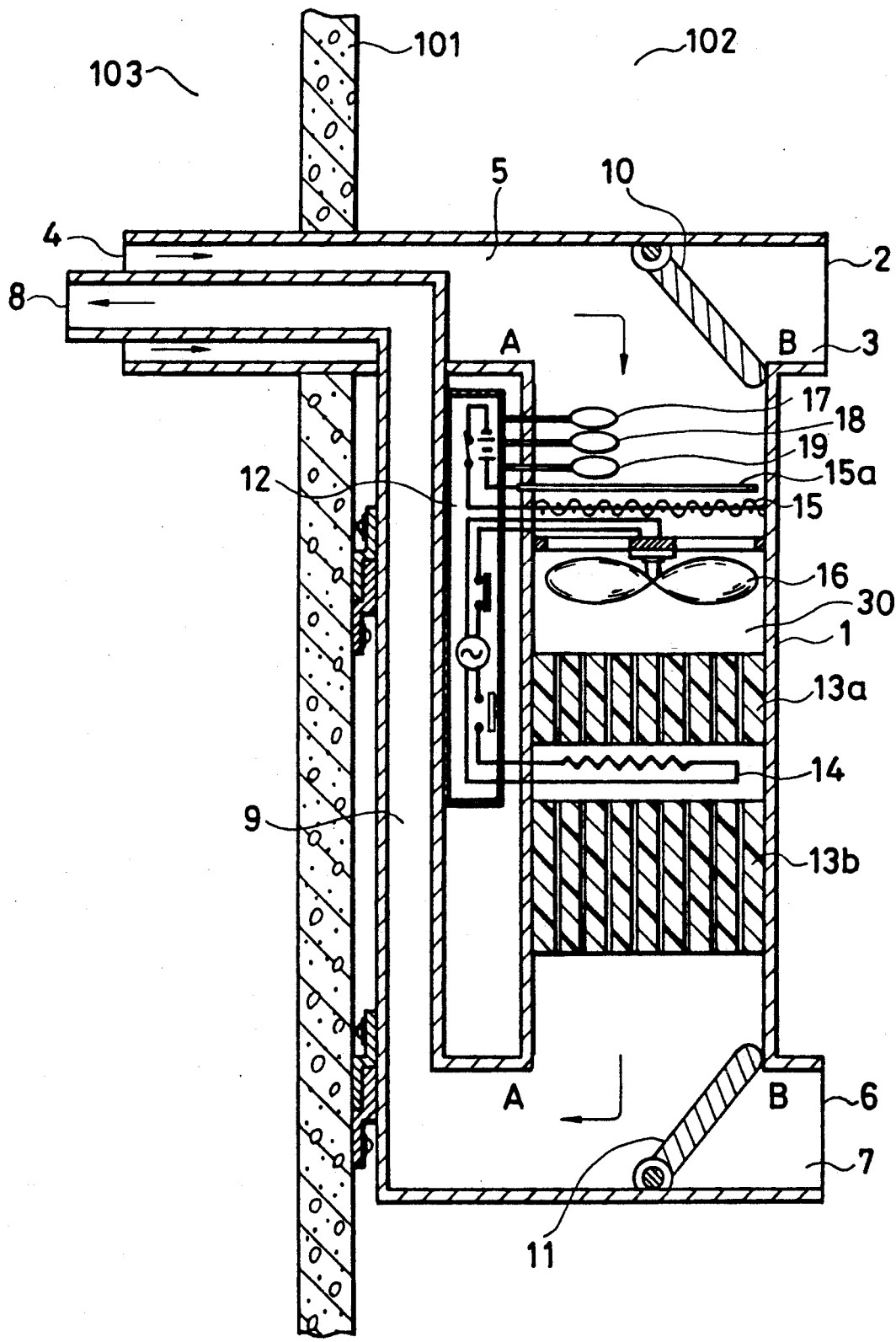
FIG. 7 is a sectional view showing an adsorption process in humidification operation of the humidity control apparatus shown in FIG. 1.

In the first step of the adsorption process, the intake damper 10 and the exhaust damper 11 are turned to close the internal-air inlet-passage 3 and the internal-air outlet-passage 7, respectively. FIG. 7 shows an operating state of the adsorption process in the humidification operation. As shown in FIG. 7, the intake damper 10 and the exhaust damper 11 are turned to the position B by the damper drive unit having the pulse motor. In the above-mentioned conditions shown in FIG. 7, the controller 12 orders start of the operation of the fan 16. As a result, the external air of the exterior space 103 is sucked in the casing 1 from the exterior-air inlet-port 4, and floating dust and particles in the sucked external air are attracted by the electrically charged filter 15, which is charged by the discharge wire 15a. The moisture in the sucked external air is absorbed by the first solid adsorber 13a and the second solid adsorber 13b for a predetermined time interval. The predetermined time interval for the adsorption process is selected by the controller 12 which takes account of the absorption capacities of the first solid adsorber 13a and the second solid adsorber 13b, the detected relative humidity of the internal air, the heat-radiation capacity of the heater 14, the ventilation capacity of the fan 16, and the space of room for service.

DESORPTION PROCESS IN HUMIDIFICATION OPERATION

Figure 8:
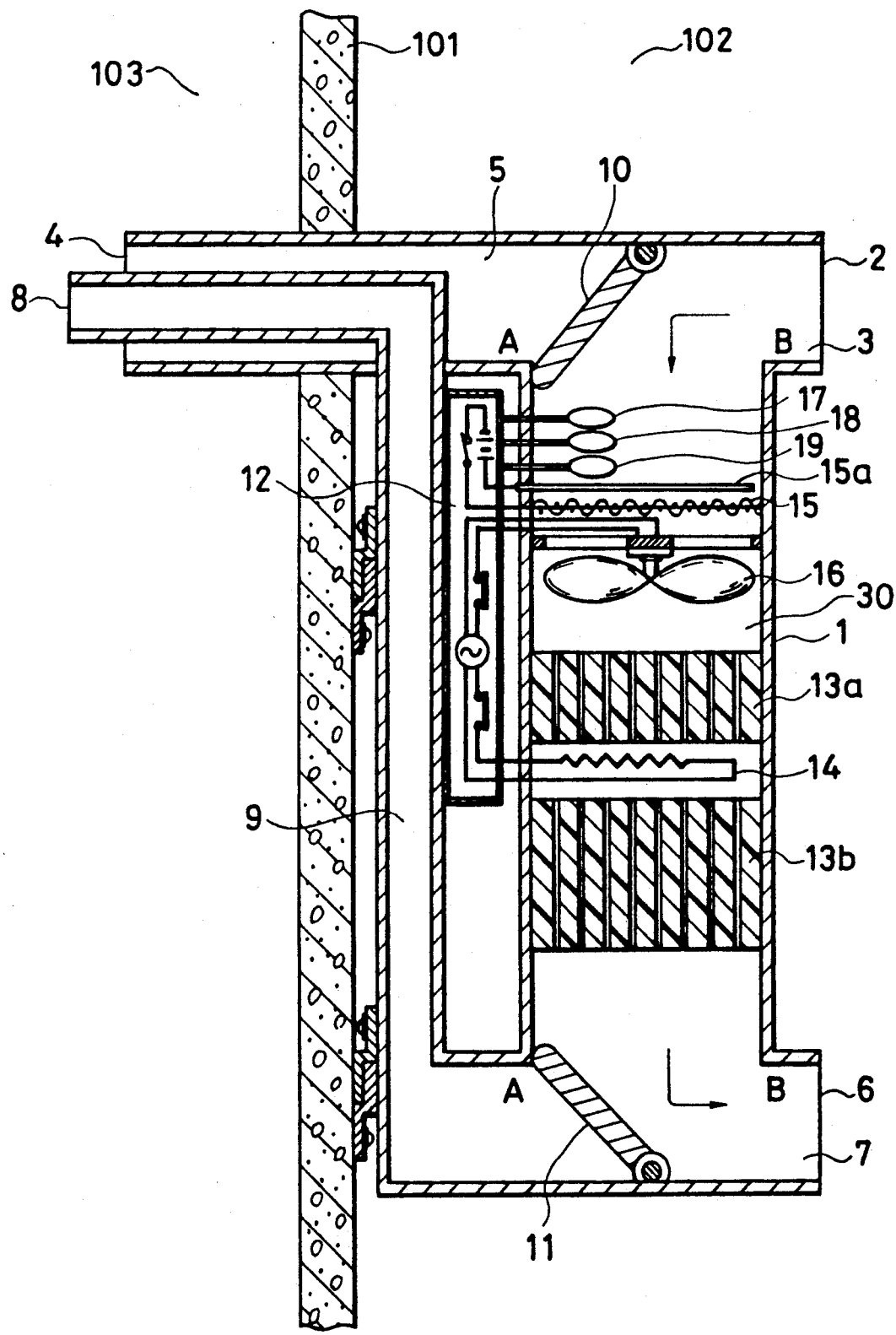
FIG. 8 is a sectional view showing a desorption process in humidification operation of the humidity control apparatus shown in FIG. 1.

Next, the controller 12 orders to start a desorption process in the humidification operation. FIG. 8 shows an operating state of the desorption process in the humidification operation. As shown in FIG. 8, the intake damper 10 and the exhaust damper 11 are arranged to close the external-air inlet-passage 5 and the external-air outlet-passage 9. In other words, the intake damper 10 and the exhaust damper 11 are turned to position A by the damper drive unit, respectively. In the conditions shown in FIG. 8, when the controller 12 orders start of the operations of the fan 16 and the heater 14, the internal air sucked from the internal-air inlet-port 2 is heated by the heater 14, and becomes the high temperature or heated air. The first solid adsorber 13a is heated directly by the heat generated by the heater 14, and the second solid adsorber 13b is heated by the high temperature air produced by the heater 14. The first solid adsorber 13a and the second solid adsorber 13b are efficiently heated, thereby to desorb the absorbed moisture of the first solid adsorber 13a and the second solid adsorber 13b. The desorbed moisture is discharged from the internal-air outlet-port 6 in order to humidify the interior space 102. When the predetermined time interval has elapsed after the heater 14 was energized, the controller 12 orders to stop the operation of the heater 14, but to keep the fan 16 in operating. The fan 16 continues to be operated until the predetermined time internal has been passed. When the predetermined time interval for cooling has elapsed, the fan 16 is stop to operate, and the desorption process in the humidification operation has finished.

The above-mentioned humidity control apparatus of the present invention can perform the humidification operation for the internal air of the interior space 102 by alternately operating the aforementioned adsorption process and the above-mentioned desorption process.

Apart from the above-mentioned embodiment of the humidity control apparatus which is operated in normal capacity in the humidification operation, a modified embodiment may be such that the humidification operation is operated by a maximum capacity of the humidity control apparatus until the humidity of the room reaches a predetermined value in order to quickly reach the predetermined humidity value. In case that the detected humidity of the room is very much higher than the predetermined reference humidity value, this humidity control apparatus would have big effect.

And further, the humidity control apparatus may be operated at its minimum capacity of the humidification operation for a little change of the humidity of the room, after the internal humidity once reaches the predetermined humidity value.

HUMIDIFICATION OPERATION WITH VENTILATION

When the controller 12 of the humidity control apparatus judges based on the detected data of the temperature sensor 17, the moisture sensor 18 and the oxygen sensor 19 that the humidification together with ventilation should be operated, the controller 12 orders start of the humidification operation with ventilation. In the humidification operation with ventilation, the humidity of the internal air of the interior space 102 is increased thereby to reach the predetermined reference humidity, and the internal air in the interior space 102 is ventilated at the same time.

In the first step of the humidification operation with ventilation, the controller 12 orders start of an adsorption process for absorbing the moisture in the internal air into the first solid adsorber 13a and the second solid adsorber 13b until the first solid adsorber 13a and the second solid adsorber 13b are saturated with the moisture of the internal air.

ADSORPTION PROCESS IN HUMIDIFICATION OPERATION WITH VENTILATION

Figure 9:
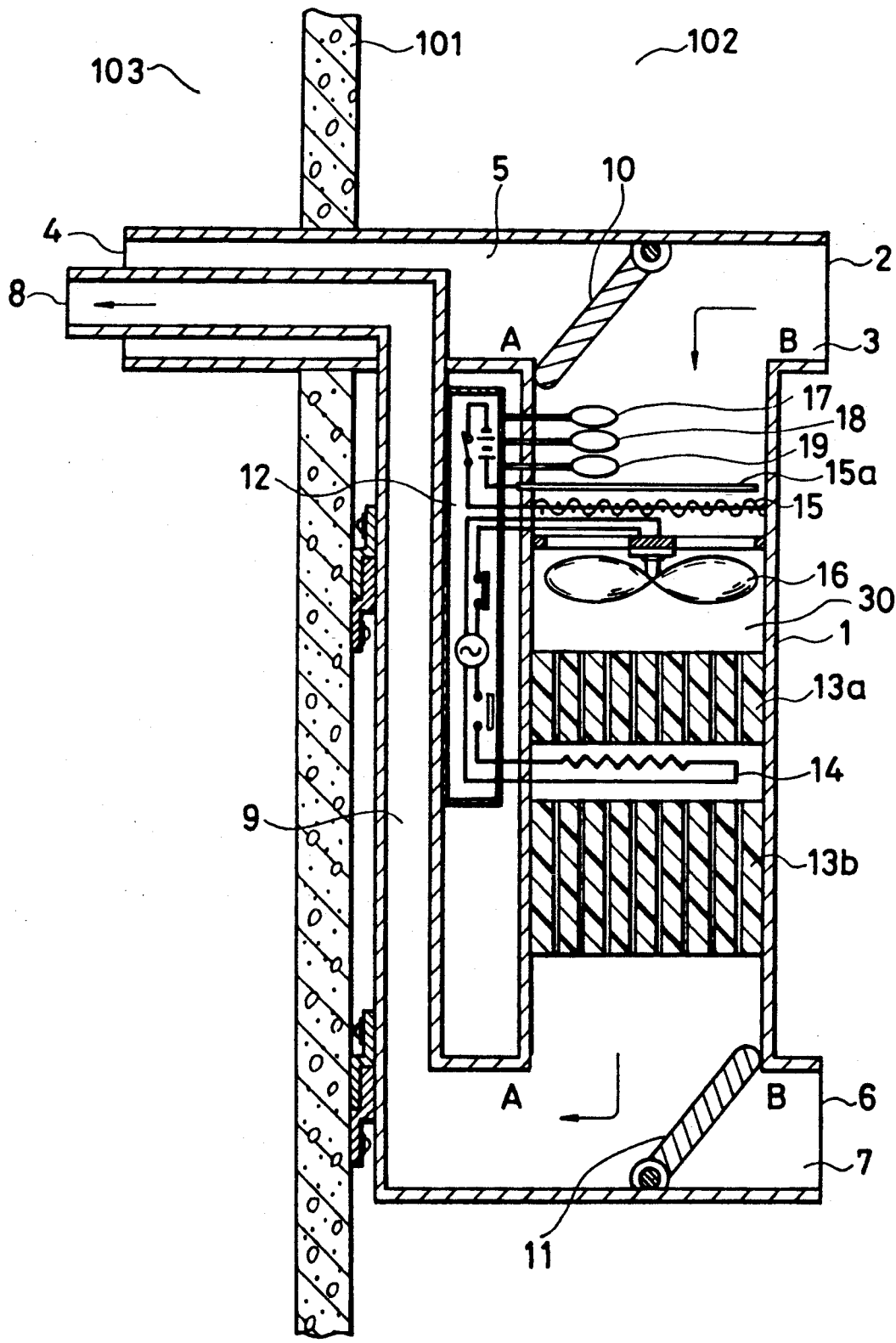
FIG. 9 is a sectional view showing an adsorption process in humidification operation with ventilation of the humidity control apparatus shown in FIG. 1.

In the first step of the adsorption process, the intake damper 10 and the exhaust damper 11 are turned to close the external-air inlet-passage 5 and the internal-air outlet-passage 7, respectively. FIG. 9 shows an operating state of the adsorption process in the humidification operation with ventilation. As shown in FIG. 9, the intake damper 10 is arranged at the position A by the damper drive unit, and the exhaust damper 11 is arranged at the position B. In the above-mentioned conditions shown in FIG. 9, the controller 12 orders to start the operation of the fan 16. As a result, the internal-air of the interior space 102 is sucked from the internal-air inlet-port 2 into the casing 1, and the sucked internal air is discharged from the external-air outlet-port 8 through the charged filter 15, the first solid adsorber 13a and the second solid adsorber 13b. The adsorption process in the humidification operation with ventilation is operated for a predetermined time interval which is selected by taking account of the absorption capacities of the first solid adsorber 13a, the second solid adsorber 13b, space of the room for service and the like.

DESORPTION PROCESS IN HUMIDIFICATION OPERATION WITH VENTILATION

Figure 10:
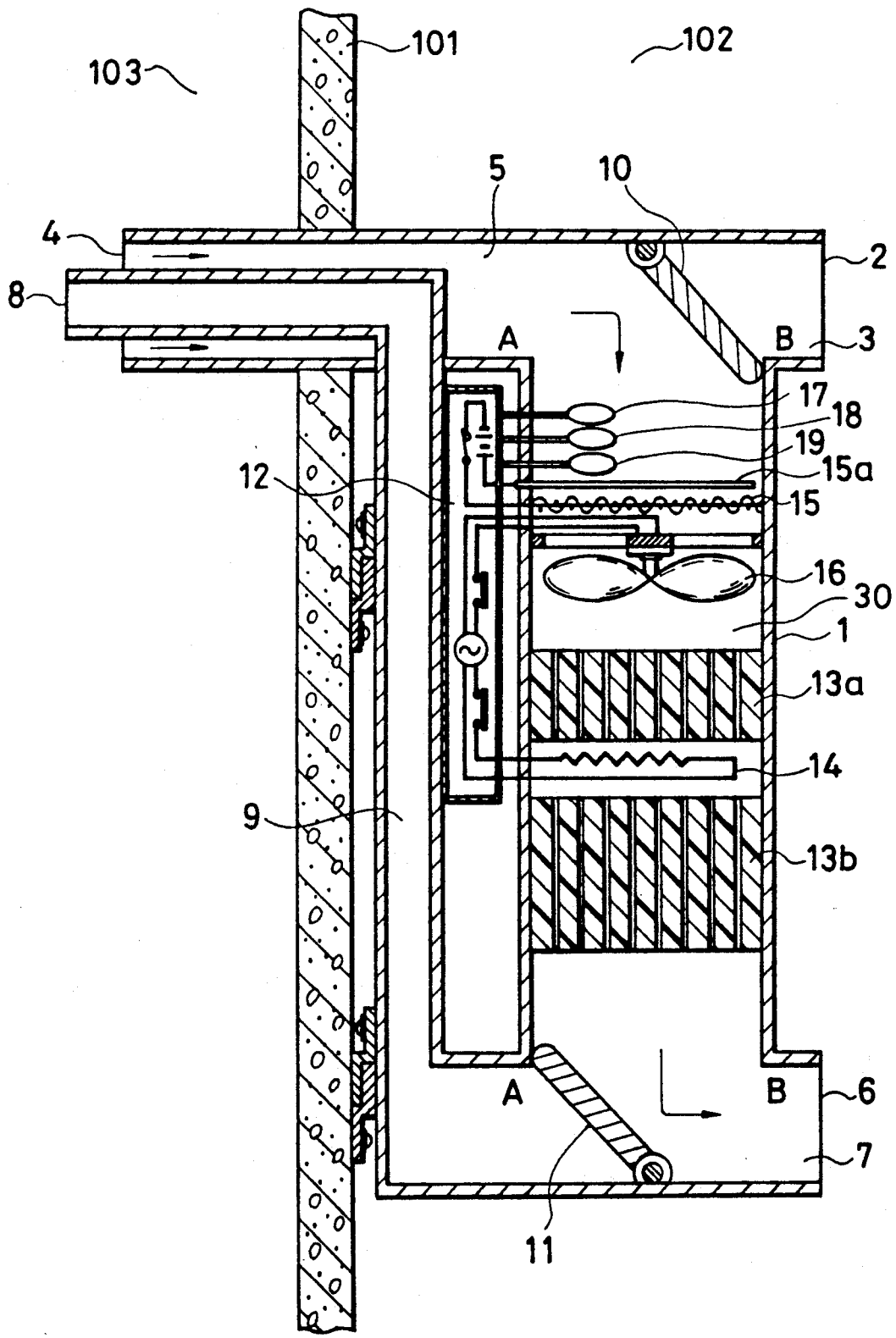
FIG. 10 is a sectional view showing a desorption process in humidification operation with ventilation of the humidity control apparatus shown in FIG. 1.

Next, the controller 12 orders to start a desorption process in the humidification operation with ventilation. FIG. 10 shows an operating state of the desorption process in the humidification operation with ventilation. As shown in FIG. 10, the intake damper 10 is turned to the position B, and the exhaust damper 11 is turned to the position A.

In the above-mentioned conditions shown in FIG. 10, the controller 12 order start of the operations of the fan 16 and the heater 14. As a result, the external air, which is sucked from the external-air inlet-port 4, is heated by the heater 14. The first solid adsorber 13a is directly heated by the heat generated by the heater 14, and the second solid adsorber 13b is heated by the high temperature air. Therefore, the absorbed moisture in the first solid adsorber 13a and the second solid adsorber 13b is desorbed by heat generated by the heater 14 and the high temperature wind. And, the desorbed moisture is discharged from the internal-air outlet-port 6 to the internal air. When the predetermined time interval has elapsed after the heater 14 was energized, the first solid adsorber 13a and the second solid adsorber 13b are in the desorbed state. When the first solid adsorber 13a and the second solid adsorber 13b become the desorbed state, the controller 12 orders to stop the operation of the heater 14, but to keep the fan 16 in operating. Then, the fan 16 is operating for cooling the first solid adsorber 13a and the second solid adsorber 13b for the predetermined time interval.

The above-mentioned humidity control apparatus of the present invention can perform the humidification operation together with ventilation for the internal air of the interior space 102 by alternately operating the aforementioned adsorption process and the above-mentioned desorption process. In case of the low humidity of the external air in the exterior space 103, the humidity control apparatus of the present invention can keep the interior space 102 at the appropriate humidity during ventilating because the humidification operation is operated together with ventilation.

As mentioned above, the humidity control apparatus of the present invention can maintain the appropriate internal environmental condition all the time, by means of selecting the appropriate operation mode of the dehumidification or the dehumidification with ventilation or the humidification or the humidification with ventilation. The appropriate operation mode is selected in accordance with detected data of a temperature, a humidity and a density of air composition, such as oxygen concentration.

The humidity control apparatus of the present invention calculates a required dehumidifying value and a required humidifying value from the internal environmental conditions (temperature, humidity, oxygen concentration and the like). And the humidity control apparatus can efficiently operates the dehumidification and the humidification by controlling the ventilation capacity of the fan 16, the heat-radiation capacity of the heater 14, the operation time interval, the space of room for service and the like, in the adsorption process and in the desorption process of the operation modes, such as a dehumidification operation and a humidification operation.

When the selected operation mode is finished, the controller 12 orders to turn the intake damper 10 and the exhaust damper 11 to the position A for closing the external-air inlet-passage 5 and the external-air outlet-passage 9. Therefore, the humidity control apparatus prevents unnecessary inflow of the external air to the interior space 102 during non-operation state of the humidity control apparatus.

Figure 11:
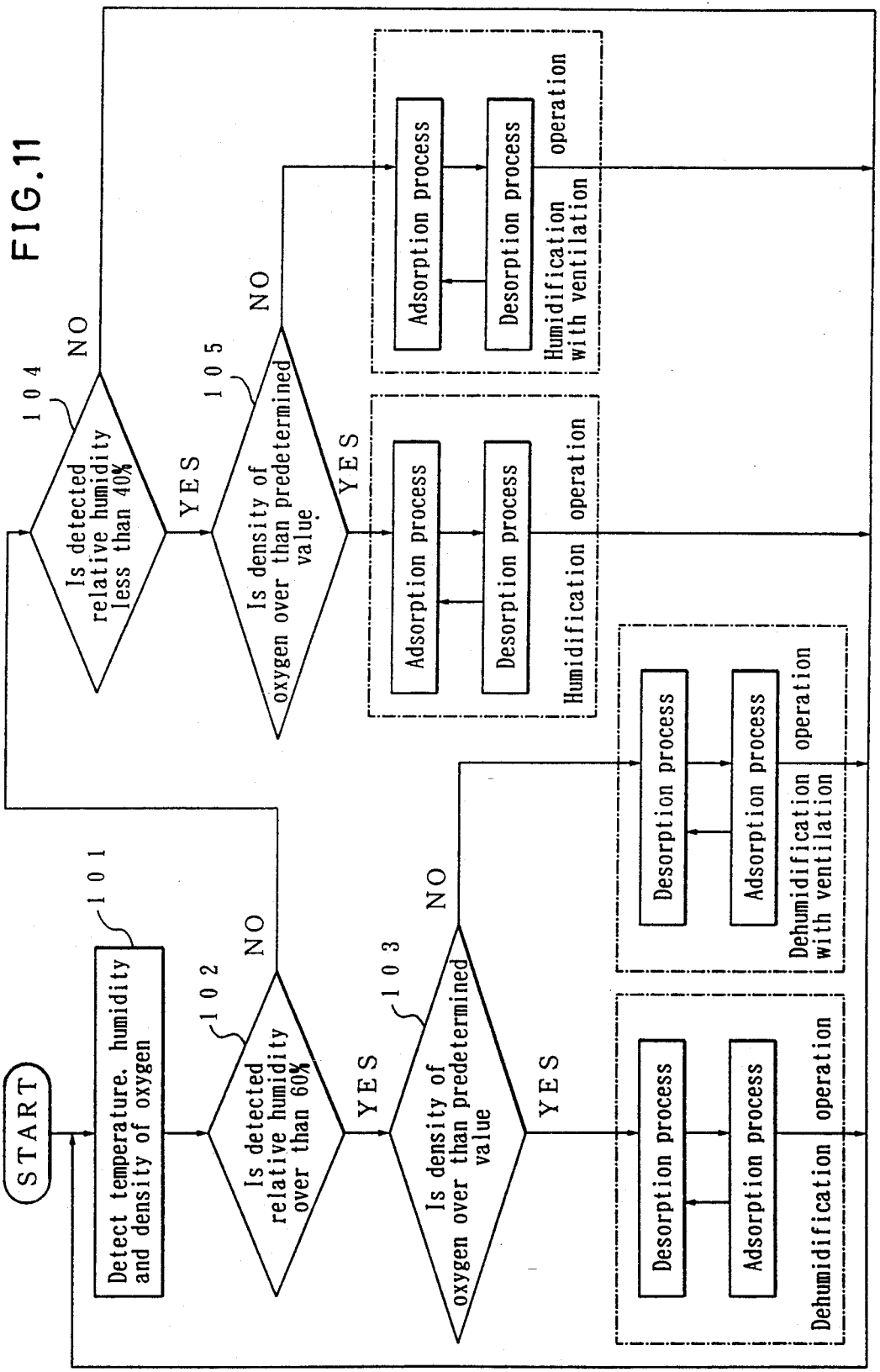
FIG. 11 is a flowchart showing an operation of the humidity control apparatus shown in FIG. 1.
Figure 12:
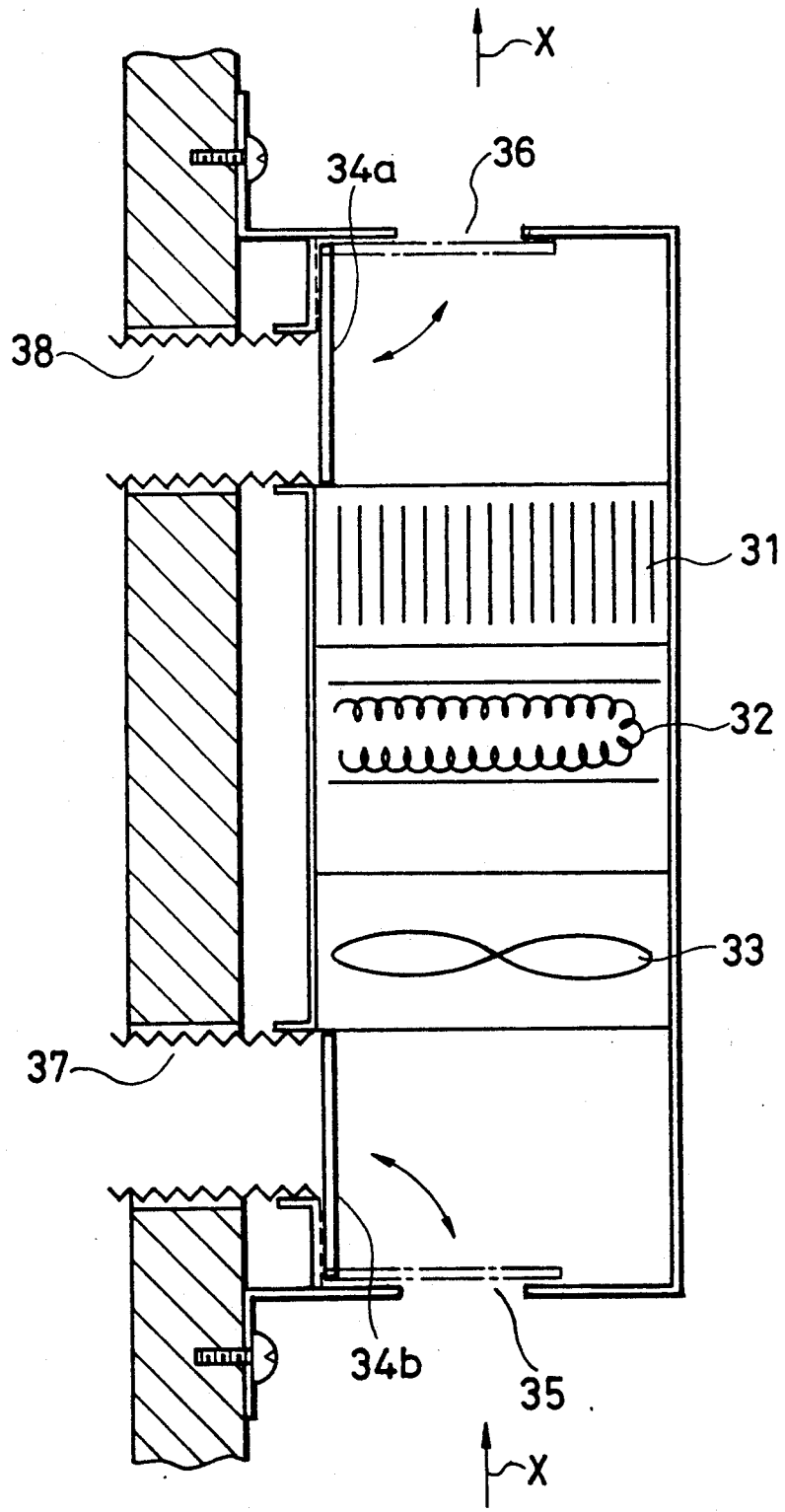
FIG. 12 is the sectional view of the conventional humidity control apparatus.

FIG. 11 shows a flowchart of the humidity control apparatus in the dehumidification, the dehumidification with ventilation, the humidification and the humidification with ventilation.

In step 101 of FIG. 11, the temperature, humidity and oxygen concentration in the internal air of the interior space 102 are detected. In step 102, the controller 12 judges whether the detected relative humidity is higher than 60% or not.

When the detected relative humidity is higher than 60%, the routine goes to step 103. In step 103, the controller 12 judges whether oxygen concentration in the internal air is higher than the predetermined reference value, such as 20%, or not.

When the detected oxygen concentration is over than the predetermined value, the aforementioned dehumidification operation is performed by the humidity control apparatus. On the contrary, when the detected density is less than the predetermined value, the aforementioned dehumidification operation with ventilation is performed.

In the above-mentioned step 102, when the controller 12 judges that the detected relative humidity is not over than 60%, the routine goes to step 104. In step 104, the controller 12 judges whether the detected relative humidity is less than 40% or not. When the detected relative humidity is less than 40%, the detected oxygen concentration is compared with a predetermined reference value in step 105.

When the detected oxygen concentration is higher than the predetermined reference value, the aforementioned humidification operation is performed. On the contrary, when the detected oxygen concentration is not higher than the predetermined reference value, the above-mentioned humidification operation with ventilation is performed.

As mentioned above, the humidity control apparatus of the present invention selects the best appropriate operation mode in accordance with the detected internal environmental conditions.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A humidity control apparatus comprising:
   an adsorber unit provided on an air-flow course to adsorb moisture in air, and which includes an upstream side adsorber and a downstream side adsorber;
   a heater which heats said adsorber unit to desorb moisture in said adsorber unit, the heater being arranged between said upstream side adsorber and said downstream side adsorber;
   a fan for making internal air flow or external air flow toward said adsorber unit;
   an intake damper provided at an upstream side of said adsorber unit and positioned to close an internal-air inlet-port or an external-air inlet-port in accordance with a selected operation mode;
   an exhaust damper provided at a downstream side of said adsorber unit and positioned to close an internal-air outlet-port or an external-air outlet-port in accordance with a selected operation mode; and
   a controller which controls operations of said heater, said fan, said intake damper and said exhaust damper in accordance with a selected operation mode, said controller is for selecting either one of the following two operation modes:
   (i) a dehumidification operation mode having:
      an adsorption process for adsorbing moisture in internal air into said adsorber unit, thereafter, said internal air is discharged to an interior space, and
      a desorption process for operating said heater and said fan flowing external air to said adsorber unit to desorb moisture in said adsorber unit, thereafter, said external air is discharged to an exterior space; and
   (ii) a humidification operation mode having:
      an adsorption process for adsorbing moisture in external air into said adsorber unit, thereafter, said external air is discharged to said exterior space, and
      a desorption process for operating said heater and said fan flowing internal air to said adsorber unit to desorb moisture in said adsorber unit, thereafter, said internal air is discharged to said interior space.

2. A humidity control apparatus in accordance with claim 1, wherein said upstream side adsorber is smaller than said downstream side adsorber.

3. A humidity control apparatus in accordance with claim 1, wherein:
   said controller selects either one of the operation modes of said dehumidification operation mode and said humidification operation mode in accordance with detected data of a temperature sensor for detecting temperature of said interior space, and a moisture sensor for detecting humidity of said interior space, and said controller calculates a difference between a predetermined reference humidity and a detected humidity calculated based on detected data of said temperature sensor and said moisture sensor, and, in accordance with said difference, selects the best operation mode which is between:

a maximum operation in which said heater is operated in maximum state in said desorption process, and said fan is operated in maximum state in said adsorption process; and a minimum operation in which said heater is operated in minimum state in said desorption process, and said fan is operated in minimum state in said adsorption process.

4. A humidity control apparatus in accordance with claim 1, wherein:

said controller controls a revolution speed of said fan and an operation time interval in said adsorption process or said desorption process in accordance with detected data of said temperature sensor and said moisture sensor, and said controller calculates a difference between a predetermined reference humidity and a detected humidity calculated based on detected data of said temperature sensor and said moisture sensor, and, in accordance with said difference, selects the best operation mode which is between:

a maximum operation in which said heater is operated in maximum state in said desorption process, and said fan is operated in maximum state in said adsorption process; and a minimum operation in which said heater is operated in minimum state in said desorption process, and first fan is operated in minimum state in said adsorption process.

5. A humidity control apparatus in accordance with claim 1, wherein said controller orders to close said external-air inlet-port and said external-air outlet-port by said intake damper and said exhaust damper when said operation mode is finished.

6. A humidity control apparatus in accordance with claim 1 which further comprises a filter provided at an upstream side of said fan.

7. A humidity control apparatus comprising:

an adsorber unit provided on an air-flow course to adsorb moisture in air, a heater which heats said adsorber unit to desorb moisture in said adsorber unit, a fan for making internal air flow or external air flow to said adsorber unit, an intake damper provided at an upstream side of said adsorber unit, and positioned to close an internal-air inlet-port or an external-air inlet-port in accordance with a selected operation mode, an exhaust damper provided at a downstream side of said adsorber unit, and positioned to close an internal-air outlet-port or an external-air outlet-port in accordance with a selected operation mode, and a controller which controls operations of said heater, said fan, said intake damper and said exhaust damper in accordance with a selected operation mode, said controller is for selecting one of the following four operation modes:

(i) a dehumidification operation mode having an adsorption process for adsorbing moisture in internal air into said adsorber unit, thereafter, said internal air is discharged to an interior space, and a desorption process for operating said heater and said fan flowing external air to said adsorber unit to desorb moisture in said adsorber unit, thereafter, said external air is discharged to an exterior space;

(ii) a humidification operation mode having an adsorption process for adsorbing moisture in external air into said adsorber unit, thereafter, said external air is discharged to said exterior space, and a desorption process for operating said heater and said fan flowing internal air to said adsorber unit to desorb moisture in said adsorber unit, thereafter, said internal air is discharged to said interior space;

(iii) a dehumidification with ventilation operation mode having:

an adsorption process for adsorbing moisture in external air into said adsorber unit, thereafter, said external air is discharged to said interior space, and a desorption process for operating said heater and said fan flowing the internal air to said adsorber unit to desorb moisture in said adsorber unit, thereafter, said internal air is discharged to said exterior space; and (iv) a humidification with ventilation operation mode having:

an adsorption process for adsorbing moisture in internal air into said adsorber unit, thereafter, said internal air is discharged to said external space, and a desorption process for operating said heater and said fan flowing the external air to said adsorber unit to desorb moisture in said adsorber unit, thereafter, said external air is discharged to said interior space, and said controller selects one of the best operation modes among said dehumidification operation mode, said humidification operation mode, said dehumidification with ventilation operation mode and said humidification with ventilation operation mode in accordance with detected data of:

a temperature sensor for detecting temperature of said interior space, a moisture sensor for detecting humidity of said interior space, and a density sensor for detecting air compositions in said interior space.

8. A humidity control apparatus in accordance with claim 7, wherein said controller controls a revolution speed of said fan and an operation time interval in said adsorption process or said desorption process in accordance with detected data of said temperature sensor and said moisture sensor.

9. A humidity control apparatus in accordance with claim 7, wherein said controller orders to close said external-air inlet-port and said external-air outlet-port by said intake damper and said exhaust damper when said operation mode is finished.

10. A humidity control apparatus in accordance with claim 7, wherein said adsorber unit includes an upstream side adsorber and a downstream side adsorber, and said heater is arranged between said upstream side adsorber and said upstream side adsorber.

11. A humidity control apparatus in accordance with claim 10, wherein said upstream side adsorber is smaller than said downstream side adsorber.

12. A humidity control apparatus in accordance with claim 7 or claim 8, wherein:

said controller calculates a difference between a predetermined reference humidity and a detected humidity calculated based on detected data of said temperature sensor and said moisture sensor, and, in accordance with said difference, selects the best operation mode which is between:

a maximum operation in which said heater is operated in maximum state in said desorption process, and said fan is operated in maximum state in said adsorption process; and a minimum operation in which said heater is operated in minimum state in the desorption process, and said fan is operated in minimum state in said adsorption process.

* * * * *